3,475,367
COPOLYMERS OF EPOXY RESINS AND ALKOXY-METHYL SUBSTITUTED POLYAMIDES
Alfred M. Tringali, Parsippany, John E. Lynch, Emerson, N.J., and Morton Friedman, Brooklyn, N.Y., assignors to Inmont Corporation, a corporation of Ohio
No Drawing. Filed Nov. 2, 1966, Ser. No. 591,449
Int. Cl. C08g 45/12
U.S. Cl. 260—33.2        12 Claims

ABSTRACT OF THE DISCLOSURE

A copolymer comprising the reaction product of from 80–98% of (A) an epoxy resin and from 2–20% of (B) an alkoxymethyl-substituted polyamide having a molecular weight of more than 10,000. The claimed copolymers provide tough, flexible coatings when applied to metal substrates.

---

This invention relates to novel copolymers of epoxy resins and alkoxymethyl substituted polyamides, and more particularly polyamides of molecular weights in excess of 10,000 especially nylons, e.g. Nylon 6,6 (polyhexamethyleneadipamide) and Nylon 6,10 (polyhexamethylenesebacamide). The invention further relates to novel flexible, tough coatings of these copolymers which can be used on metals which are extensively worked and fabricated such as screw bottle caps. The working of the coated metals does not affect the properties or the integrity of the coatings of this invention.

Epoxy resin coatings have many highly desirable properties required for metal coatings for bottle caps such as screw tops. Such coatings are hard, tough, adherent to metals, abrasion resistant and resistant to virtually all foods and solvents to which bottle cap coatings would be subjected to. However, the one major drawback to the use of epoxy resins in bottle cap coatings has been the lack of sufficient flexibility to adhere to the metal surface and to withstand cracking during the procedures involved to fabricating bottle caps such as knurling, bending at very severe angles and screw threading.

We have now developed a modified epoxy resin copolymer which provides coatings in which the flexibility deficiency is eliminated while all of the other desirable properties are retained.

In the novel copolymers of our invention, epoxy resins formed by the condensation polymerization of epichlorohydrin and p,p'-dihydroxy dipheynl dimethyl methane are modified with an alkoxymethyl-substituted polyamide of a high molecular weight (e.g., nylon) as a comonomer. The copolymers are formed by the heat reaction of the monomeric components. The polyamide has a high molecular weight, greater than 10,000 and preferably 15,000 to 25,000. The polyamide is preferably either polyhexamethyleneadipamide (Nylon 6,6) or polyhexamethylenesebacamide (Nylon 6,10). The polyamide is so modified that from 30 to 50% of the amide groups are substituted with alkoxymethyl groups in which the alkoxy group contains from 1 to 4 carbons.

The copolymers should contain from 80 to 98% of the epoxy resin and from 2 to 20% of the polyamide. Otherwise, the copolymer will be deficient in toughness and resistance properties of epoxy resins. (Unless otherwise specified, all proportions set forth in this specification and claims are by weight.)

It is essential to the practice of this invention that the polyamides be of the high molecular weight type such as nylon as set forth above. When polyamides having lower molecular weights below 10,000 are tried, the resulting copolymers do not have the requisite flexibility. Also, blends of higher polyamides and epoxy resins in the same ratios as in our copolymers appear to be incompatible. Coating compositions containing such blends are thixotropic, viscous and difficult to handle. They show separation on standing. Cured coatings of such blends are not uniform showing graininess and discontinuities.

In order to be reactive with the epoxy resins in the proportions set forth in this invention, the polyamide must be alkoxymethyl substituted. The preparation of alkoxymethyl substituted polyamides is described in the article "Preparation and Properties of N-Methylol, N-Alkoxymethyl and N-Alkylthiomethyl Polyamides," pages 651–5, Journal of the American Chemical Soc., vol. 71 February 1949) by Cairns et al. Alkoxymethyl polyamides are readily prepared by the action of a solution of formaldehyde in an alcohol on a polyamide dissolved in an acid such as formic acid. In another method of preparation, solid polyamide is treated with an alcohol-formaldehyde solution with heat in the presence of catalytic quantities of acid. The alcohol is a lower alkanol having from 1 to 4 carbons and of course the alcohol selected will determine the alkoxy groups.

In order to prepare the copolymers of this invention, the epoxy resin and the alkoxymethyl polyamide are reacted by heating at a temperature of at least 350° F. The copolymer produced has excellent solubility in alkoxyalkanols, particularly alkoxyalkanols in which the alkyl groups each contain preferably from 1 to 4 carbons; that is the alkyl groups in both the alkoxy and alkanol components contain from 1 to 4 carbons. Some suitable representative alkoxyalkanols which may be used are:

Methyl Cellosolve, [2-methoxyethanol]
Cellosolve, [2-ethoxyethanol]
Butyl Cellosolve, [2-butoxyethanol]
2-(methoxy methoxy) ethanol
Methyl Carbitol, [2-(methoxy ethoxy) ethanol]
Carbitol, [2-(ethoxy ethoxy) ethanol]
Butyl Carbitol, [2-(butoxy ethoxy) ethanol]
Dowanol 33B, [1-methoxy-2-propanol]
Dowanol 34B, [1-ethoxy-2-propanol]
Dowanol 37B, [1-butoxy-2-propanol]

Solutions of the copolymers of this invention in the above described solvents provide desirable thermosetting coating compositions for metals which are to be worked or fabricated such as screw bottle caps. The coating compositions preferably contain any of the conventional curing agents for epoxy resins such as ethylene diamine, diethylene triamine, triethylene tetramine, piperidine or dimethylaminomethyl phenol, as well as dicyandiamide, diaminophenyl sulfone, borontrifluoride-monoethylamine, dodecenylsuccinic anhydride, phthalic anhydride, chlorendic anhydride and trimetlitic anhydride. As with epoxy resins, the curing agent is incorporated into the coating composition just prior to curing. The solution is then coated onto the metal surface at a solids content preferably from 20 to 70%, with conventional stoichiometric amounts of curing agent included based upon epoxide equivalents present and the coating is preferably cured at from room temperature to 400° F. for from 1 to 30 minutes.

The epoxy resins or polyepoxides used in this invention are resins produced by the reaction of a polyhydric phenol, particularly p,p'-dihydroxy diphenyl dimethyl methane with epichlorohydrin in accordance with the procedure of U.S. Patent 2,633,458. By regulating the proportions of the two reactants, the molecular size and molecular structure of the polyepoxide resins may be controlled. By using an excess of epichlorohydrin, a low molecular weight polyepoxide resin may be produced. By increasing the amount of p,p'-dihydroxy diphenyl dimethyl methane, a higher weight polyepoxide resin may be produced. For hot melting applications, the epoxy resins should preferably have a molecular weight of at least 350 and most preferably from 350 to 3,000. The polyepoxide resins produced by the reaction of epichlorohydrin and p,p'-dihydroxy diphenyl dimethyl methane may in addition be esterified with vegetable oil fatty acids including coconut acids, cottonseed acids, dehydrated castor fatty acids, linseed oil fatty acids, oiticia fatty acids, soy acids and tung fatty acids.

The copolymers of this invention may be used in place of conventional epoxy resins to increase flexibility in conventional blends of epoxy resins. Accordingly, the copolymers may be blended with such standard resins as urea-formaldehyde, melamine-formaldehyde, phenolic resins and copolymers of vinyl chloride and vinyl acetate.

The following examples will illustrate the practice of this invention:

EXAMPLE 1

90 parts of Epon 1001 (an epoxy resin formed by the reaction of p,p'-dihydroxyl diphenyl dimethyl methane and epichlorohydrin having an average molecular weight of about 900 and an epoxide equivalent weight of about 500) and 10 parts of N-methoxymethyl Nylon 6,6 (N-methoxymethyl polyhexamethylene-adipamide which is prepared in accordance with the procedure set forth in the article "Preparation and Properties of N-Methylol, N-Alkoxymethyl and N-Alkylthiomethyl Polyamide," pages 651–5, Journal of the American Chemical Society, vol. 71, (February 1949) by Cairns et al., particularly procedure II(a) p. 654 from polyhexamethylene-diapamide having an average molecular weight of from 20,000 to 25,000, formaldehyde and methanol and having about 40% of the amide groups substituted with methoxymethyl groups) are reacted by applying heat at a temperature of 350° F. or above for a period of 20 minutes. The reaction may be continued for as long as the viscosity of the reaction mixture increases at a constant gradual rate. At the first sign of a marked rise in the rate of viscosity increase, the reaction is terminated by removing the heat. Another method by which the time for ending the reaction may be determined is by regularly placing test droplets of the reaction mixture on a surface at room temperature. The droplet should solidify to a clear film. At the first sign of haziness in the film of a droplet, the reaction should be terminated. The reaction product is a clear uniform solid.

A 40% solution by weight is prepared by dissolving a portion of the copolymer formed above in Cellosolve (2-ethoxyethanol). The solution is clear. Then a conventional epoxy resin catalyst is added e.g., 4.5 parts of triethylene tetramine for each 100 parts of copolymer. The resulting solution is coated onto tinplate and dried to a thickness of 0.5 mil. by curing at 350° F. for about 15 minutes. A circular disc is cut from the cured coated tinplate and fabricated into a screw bottle cap by knurling and threading. The resulting bottle cap coating displays excellent adhesion, excellent flexibility and resistance to fracturing on being fabricated. This is evidenced by the following test: the can end is submerged for five minutes in an aqueous solution containing 200 g. $CuSO_4$, 200 ml. glacial acetic acid and 200 ml. of 12 N HCl per liter. Fractures or discontinuities show up as rust spots or lines. Such fractures were substantially absent.

The coated bottle cap also displays excellent steam processing resistance. Steam processing resistance is determined by contacting the coating with steam at 250° F. Films prepared in the above example withstood 60 minutes contact without showing any appreciable discontinuity of film or film blush. In addition, the coating displays excellent resistance to solvents such as Cellosolve or methyl ethyl ketone.

EXAMPLE 2

Example 1 is repeated using the same conditions, procedure, ingredients and proportions except that 85 parts of Epon 1007 (an epoxy resin formed by the reaction of p,p'dihydroxyl diphenyl dimethyl methane and epichlorohydrin having an average molecular weight of about 2900 and an epoxide equivalent weight of 1650–2050) and 15 parts of the N-methoxymethyl Nylon 6,6 are used.

The copolymer formed when tested in a coating as in Example 1 displays the same desirable properties as the coating of Example 1.

EXAMPLE 3

Example 1 is repeated using the same conditions, procedure, ingredients and proportions except that Epon 828 (an epoxy resin formed by the reaction of p,p'-dihydroxyl diphenyl dimethyl methane and epichlorohydrin having an average molecular weight of about 350–400 and an epoxide equivalent weight of 175–210) is used in place of Epon 1001.

The copolymer formed when tested in a coating as in Example 1 displays the same desirable properties as the coating of Example 1.

EXAMPLE 4

Example 1 is repeated using the same ingredients, proportions, conditions and procedure except that in place of the Epon: Nylon ratio of 90:10, the following ratios are respectively used 80:20 and 95:5. The results are quite similar to those of Example 1.

EXAMPLE 5

Example 1 is repeated using the same ingredients, proportions, conditions and procedure except that in place of N-methoxymethyl polyhexamethyleneadipamide, N-isobutyloxymethyl polyhexamethyleneadipamide is used.

The copolymer formed when tested in a coating as in Example 1 displays the same desirable properties as the coating of Example 1.

EXAMPLE 6

Example 1 is repeated using the same ingredients, proportions, conditions and procedure except that in place of N-methoxymethyl polyhexamethyleneadipamide there is used N-n-propoxymethyl polyhexamethyleneadipamide.

The copolymer formed when tested in a coating as in Example 1 displays the same desirable properties as the coating of Example 1.

EXAMPLE 7

Example 1 is repeated using the same ingredients, proportions, conditions and procedure except that in place of N-methoxymethyl polyhexamethyleneadipamide, there is used N-methoxymethyl polyhexamethylenesebacamide.

The resulting copolymer has similar properties to that of Example 1.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

We claim:

1. A copolymer comprising the reaction product of 80 to 98% of (A) an epoxy resin formed by the condensation polymerization of epichlorohydrin and p,p'-dihydroxy diphenyl dimethyl methane and 2 to 20% of (B) an alkoxymethyl-substituted polyamide having a molecular weight of more than 10,000 selected from the group consisting of N-alkoxymethyl polyhexamethyleneadipamide and N-alkoxymethyl polyhexamethylenesebacamide, from 30 to 50% of the amide groups in said polyamides being substituted with alkoxymethyl groups and said alkoxys contain from 1 to 4 carbons, said reaction having been conducted at a temperature of at least 350° F. and for at least 20 minutes.

2. The copolymers of claim 1 wherein said polyamides are methoxymethyl-substituted polyamides.

3. The copolymers of claim 1 wherein said polyamides are N-alkoxymethyl polyhexamethylenesebacamides.

4. The copolymers of claim 1 wherein said polyamides are N-alkoxymethyl polyhexamethyleneadipamides.

5. The copolymers of claim 4 wherein 90% of the epoxy resin are reacted with 10% of the polyamide.

6. A coating composition comprising a solution of the copolymer of claim 1 in an alkoxyalkanol solvent in which the alkyl groups each contain from 1 to 4 carbons.

7. A coating composition comprising a solution of the copolymer of claim 5 in an alkoxyalkanol in which the alkyl groups each contain from 1 to 4 carbons.

8. The coating composition of claim 6 wherein the solvent is 2-ethoxyethanol.

9. A method of copolymerizing an epoxy resin and an alkoxymethyl-substituted polyamide which comprises reacting 80 to p8% of (A) an epoxy resin formed by the condensation polymerization of epichlorohydrin and p,p'-dihydroxy diphenyl dimethyl methane and 2 to 20% of (B) an alkoxymethyl-substituted polyamide having a molecular weight of more than 10,000 selected from the group consisting of N-alkoxymethyl polyhexamethyleneadipamide and N-alkoxymethyl polyhexamethylenesebacamide, from 30 to 50% of the amide groups in said polyamides being substituted with alkoxymethyl groups and said alkoxys contain from 1 to 4 carbons at a temperature of at least 350° F.

10. The method of claim 9 wherein the reaction is conducted in the substantial absence of solvent.

11. The method of claim 9 wherein said polyamides are N-alkoxymethyl polyhexamethyleneadipamides.

12. The method of claim 9 wherein 90% of the epoxy resin are reacted with 10% of the polyamide.

References Cited

UNITED STATES PATENTS

| | | | |
|---|---|---|---|
| 3,371,008 | 2/1968 | Lopez | 260—830 |
| 3,336,415 | 8/1967 | Kennedy | 260—830 |

FOREIGN PATENTS

| | | |
|---|---|---|
| 986,190 | 3/1965 | Great Britain. |
| 1,124,688 | 3/1962 | Germany. |

MORRIS LIEBMAN, Primary Examiner

L. T. JACOBS, Assistant Examiner

U.S. Cl. X.R.

260—830

UNITED STATES PATENT OFFICE
CERTIFICATE OF CORRECTION

Patent No. 3,475,367                          October 28, 196

Alfred M. Tringali et al.

It is certified that error appears in the above identified patent and that said Letters Patent are hereby corrected as shown below:

Column 1, line 50, "dipheynl" should read -- diphenyl --.
Column 5, line 17, "p8%" should read -- 98% --.

Signed and sealed this 27th day of October 1970.

(SEAL)
Attest:

Edward M. Fletcher, Jr.                  WILLIAM E. SCHUYLER, JR.
Attesting Officer                            Commissioner of Patents